United States Patent [19]

Furrer et al.

[11] 3,902,698
[45] Sept. 2, 1975

[54] SPRING COMPRESSOR

[75] Inventors: Fredrick J. Furrer, St. Charles; Ronald J. Kraus, Wheaton, both of Ill.

[73] Assignee: Maremont Corporation, Chicago, Ill.

[22] Filed: Oct. 30, 1974

[21] Appl. No.: 519,204

[52] U.S. Cl. ............................................. 254/10.5
[51] Int. Cl. ........................................... B23p 19/04
[58] Field of Search ............ 29/215, 216, 217, 218, 29/225, 227, 252; 254/10.5

[56] References Cited
UNITED STATES PATENTS

| | | | |
|---|---|---|---|
| 1,469,076 | 9/1923 | Faber | 254/10.5 |
| 2,430,201 | 11/1947 | Wyscaver | 29/252 |
| 2,948,057 | 8/1960 | Dagewais | 254/10.5 |
| 3,016,603 | 1/1962 | Rutland | 29/252 |
| 3,063,677 | 11/1962 | Snyder | 254/51 |
| 3,814,382 | 6/1974 | Castoe | 254/10.5 |

Primary Examiner—Othell M. Simpson
Attorney, Agent, or Firm—Cushman, Darby & Cushman

[57] ABSTRACT

A spring compressor especially adapted for use with McPherson shock assemblies. A coil engaging hooks on a pair of levers mounted to a movable portion of the unit engage coils of the spring to be compressed at locations thereof spaced from the seat for the spring, and from the exterior thereof. The force for compressing the spring is supplied by pneumatic means having an inherent self-damping feature, and air may only be released therefrom by allowing it to slowly bleed through a conventional tire valve. Additional safety pin and hoop means are provided, as well as return springs for assisting the pneumatic means in returning to the original position thereof upon release of the air therefrom.

11 Claims, 3 Drawing Figures

SPRING COMPRESSOR

BACKGROUND AND SUMMARY OF THE INVENTION

The invention relates to a powered spring compressor especially adapted for use with McPherson spring shock assemblies and shock overload spring assemblies. While the prior art is replete with spring compressing devices (see, for example, U.S. Pat. Nos. 2,234,819, 2,387,839, 2,948,057, and 3,278,157), there are problems not completely solved by the prior art devices. For instance, it is not known to provide means to insure only slow release of the fluid from fluid-powered compressing means for a spring compressor, and means for engaging a spring for compression have not been provided that are adjustable depending upon the pitch of the spring, provide positive engagement for compression of even large springs, and do not interfere in any way with disassembly of components associated with the spring after compression thereof - especially for use with McPherson shock assemblies.

According to the teachings of the present invention, a spring compressor is provided that is pneumatically operated to positively compress a compression assembly. The pneumatic compression means have a built-in damping feature and a slow release valve so that upon release thereof, they cannot quickly return under the compression of the spring, which quick return might result in damage to the equipment, or in injury to the operator thereof should the spring fly loose. Spring hooks are provided on the compression assembly for positively engaging coils of the spring spaced from the spring seat from exterior thereof so that while the engagement with the spring is positive, the spring seat is readily accessible. The spring hooks are also adjustable, depending upon the pitch of the spring to be compressed. Safety means, in addition to the damping action and slow release valve of the compressing means, are provided for preventing an unwanted return of the compressing assembly, as are particular frame means for readily receiving various spring assemblies, especially McPherson shock assemblies, and spring return means for the compressing means.

It is the principal object of the invention to provide an improved spring compressor, eliminating the drawbacks of prior art devices. This and other objects of the invention will become clear from an inspection of the detailed description of the invention, and from the appended claims.

DETAILED DESCRIPTION OF THE INVENTION

Figure 1:
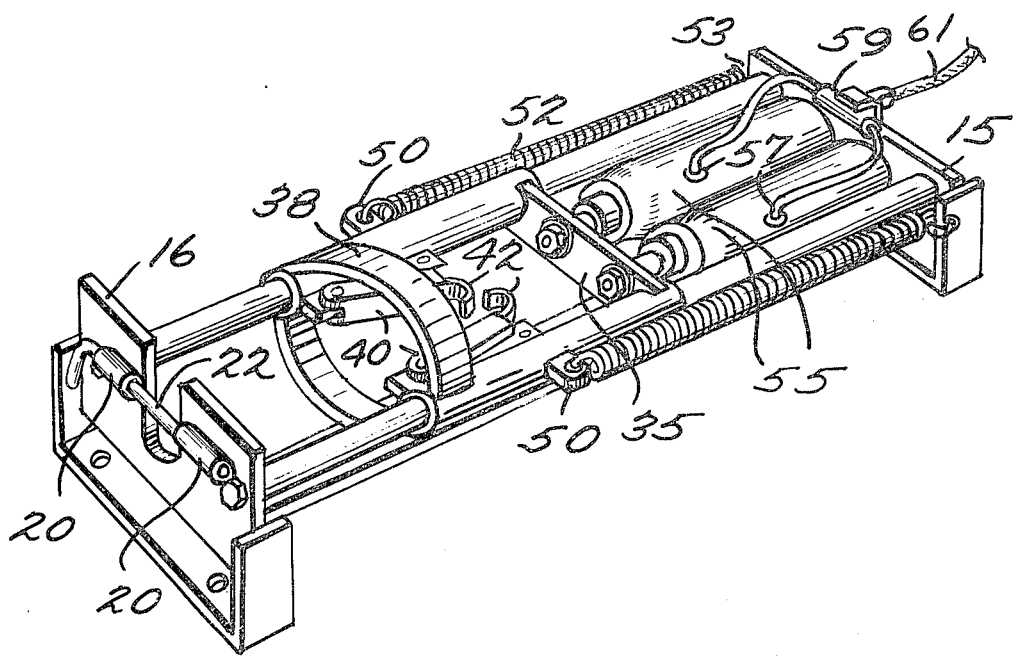
FIG. 1 is a persepctive view of the unit in the rest position thereof.
Figure 2:
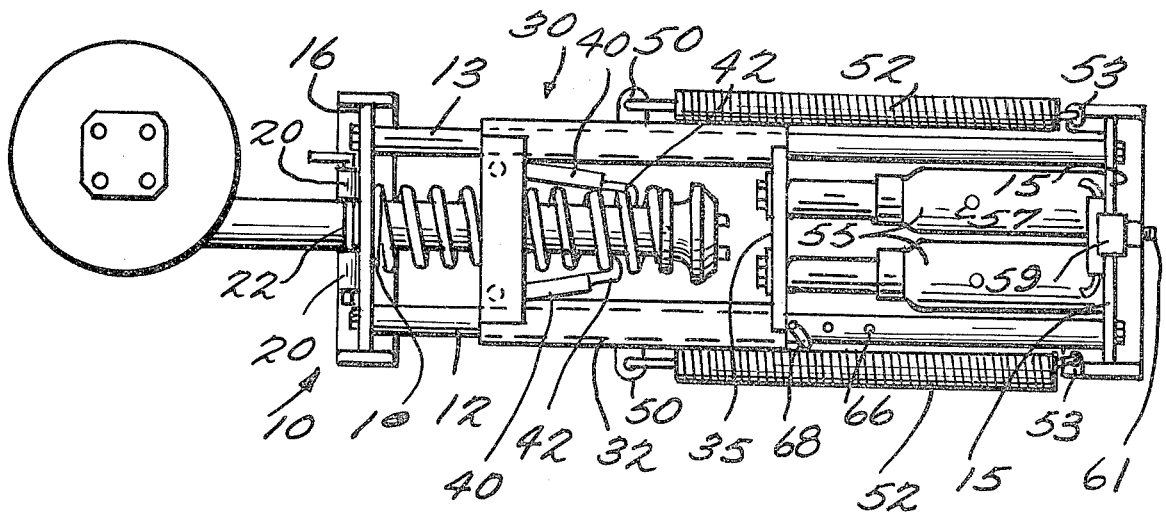
FIG. 2 is a top plan view of the unit during compressing of a spring of a McPherson shock assembly thereby.

A spring-compressing unit according to the teachings of the present invention is shown generally at 10 in FIGS. 1 and 2. The spring-compressing unit 10 comprises a frame composed of parallel side guide rods 12 and 13, and parallel end plates 15 and 16. The end plate 16 has an open-ended cutout portion 18 therein for receiving a spring or an assembly having a spring — especially a McPherson shock assembly — to be compressed by the unit. The plate 16 has guide extensions 20 at both ends of the open end of the cutout 18 for receiving a pin 22. The pin 22 is inserted through the guide extensions 20 after the spring assembly has been received thereby.

Figure 3:
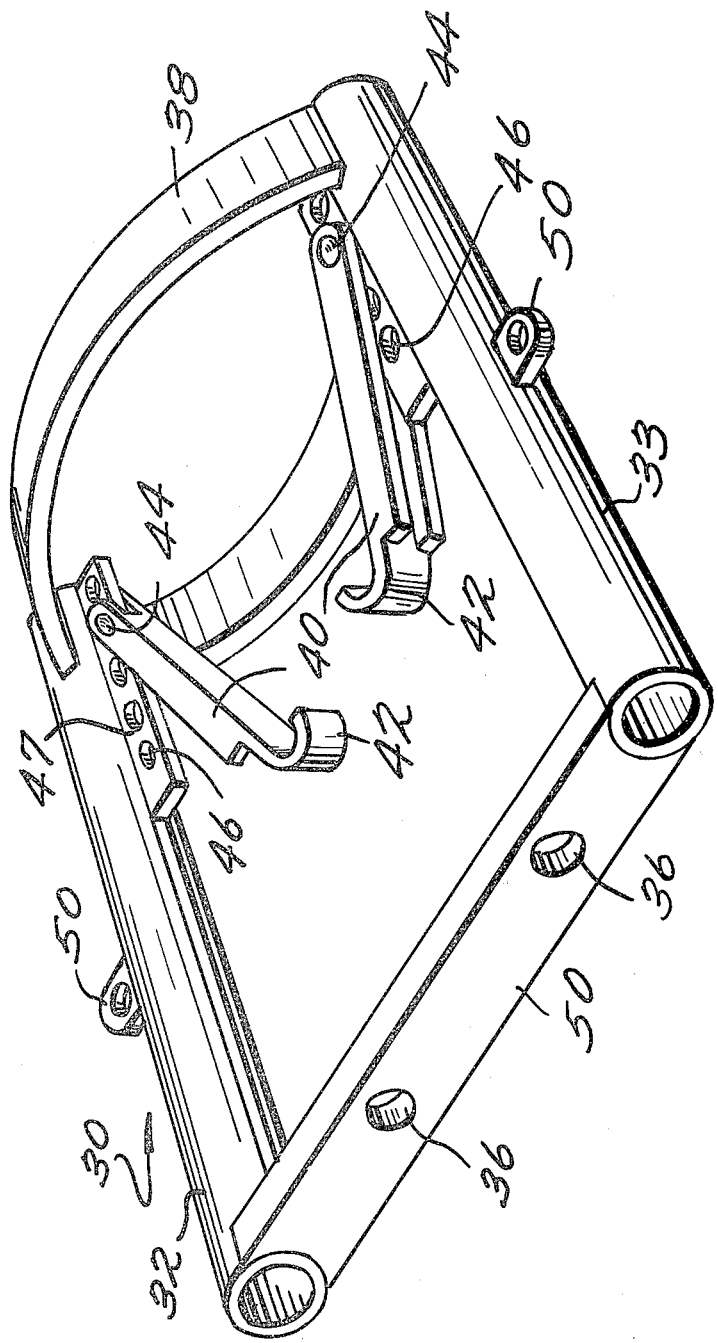
FIG. 3 is a detail view of the slidable compressing assembly of the unit and the spring-engaging hooks associated therewith.

Slidably mounted on the guide rods 12, 13 is a spring engaging and compressing assembly, shown generally at 30 (see FIG. 3 especially). The assembly 30 comprises a pair of tubular side members 32, 33 that receive the guide rods 12, 13 and are slidable thereover, and an end plate 35 rigidly attached to one end of the members 32, 33. The plate 35 has hole 36 therein for connection to a compressive force supplying means, as will be described more fully below. Hoops 38 are connected to the ends of side members 32, 33 opposite the plate 35. The hoops 38, while not interfering with the accessibility of the spring assembly when received by the unit, nor the compression of the spring, provide a safety means to stop the flight of a spring should it somehow come loose when being compressed. The hoops 38 also assist in providing for the correct spacing between the side members 32 and 33 during assembly of the unit 10.

Located near the ends of the side members 32, 33 opposite the plate 35 are plate-like extension portions 47. The portions 47, which are rigidly attached to their respective side member, contain a plurality of holes 46 therein. These plates 47 are for mounting the spring engaging levers 40 of the assembly 30. Each lever 40 has a hook-shaped portion 42 at one end thereof for positively engaging a coil of a spring to be compressed, and at the other end thereof, is pivotally connected to its respective plate 47 by a pin or bolt 44 passed through holes in the lever 40 and a selected hole 46 in plate 47. It is preferred that each lever 40 have a body portion to which the hook 42 is attached, and ear portions perpendicular to the body portion, the ear portions receiving a plate 47 therebetween and each having a hold therein for receipt of the bolt 44. Each lever 40 is adjustable with respect to the assembly 30 by merely removing its pin 40, moving the lever into operative relationship with another hold 46 in its respective plate 47, and reinserting the pin therethrough. Thus, the coil-engaging levers are adjustable with respect to the side members 32, 33 to accommodate springs of different lengths and to engage different coils of said springs, and are adjustable with respect to each other to positively engage springs of different pitch.

By reference to FIG. 2, it is clear that when the unit 10 is in operation to compress a spring, such as spring 70 of a McPherson shock assembly 72, it will engage the spring at points 74, 75 thereof spaced from the upper end and seat 77 of the assembly 72, and will engage the spring from the exterior thereof. This engagement has many advantages. Since the hooks 42 engage the spring from the exterior thereof, and do not extend to the interior thereof to any appreciable extent, they will not interfere with the portion of the assembly 72 located within the coils of the spring 70. Also, the hooks 42 are adjustable from the exterior of the assembly 72 to make it easy to see exactly which coils of spring 70 it is most advantageous to have them engage once the spring assembly 72 has been received by the cutout 18 in plate 16. Since the hooks 42 will engage coils of the spring at points 74, 75 spaced from the seat 77 of the assembly 72, this seat will be accessible for any repair work that it is desirable to perform thereon, and so that the rest of the assembly 72 may be more easily detached from the spring 70, should this be the reason for compressing the spring 70.

Biasing the assembly 30 to return to its original position (FIG. 1) are springs 52 connected to plates 50 attached to side members 32, 33, respectively, and plates 53 attached to the opposite ends of plate 15.

The force for moving the assembly 30 to compress a spring 70 engaged thereby is supplied by the force-supplying means 55 connected between plates 35 and 15 of unit 10. The means 55 are air-adjustable shock absorbers, sold under the name "Gabriel Hi-jackers," and fully disclosed in commonly-assigned U.S. Pat. No. 3,149,830, which is incorporated by reference into the present disclosure. Air is supplied through hoses 56 and connections 57 to the pneumatic means 55. The free connections 57 replace the tire valves usually utilized with the air-adjustable shocks 55, and instead, a conventional tire valve 59 is connected to the hoses 56. A hose, such as 61, may be utilized to supply air to the valve 59.

It is noted that the air-adjustable shocks 55 are inherently self-damping. This feature is particularly important for the device of the present invention since the self-damping feature means that there will never be any quick jerky movements of the pneumatic compressing means 55 which might result in a spring under compression being released, and thus injury to the operator or damage to property. This is especially desirable when the large springs often associated with McPherson suspension assemblies are to be compressed and replaced. Also, since a conventional tire valve such as 59 allows only slow bleeding and must be positively continuously actuated, it requires the operator to consciously release the pressure from the pneumatic means 55, and further insures that there will be no quick retraction of the means 55 which would result in a spring being compressed, thereby coming loose. As an even further safety precaution, a plurality of holes 66 may be provided in one of the guide rods 12 or 13, for receipt of a pin 68. After the assembly 30 has been moved the desired amount, the pin 68 is placed in the last uncovered hole 66 and abuts against one of the side members 32, 33 preventing return movement thereof under the influence of springs 52 and the spring 70 being compressed.

Operation

The operation of the spring compressing unit 10 of the present invention is as follows: A McPherson shock assembly 72 or the like is placed in the unit 10 so that the bottom spring seat thereof abuts the interior surface of end plate 16, and so that it is received by open-ended cutout 18 in plate 16. Then pin 22 is passed through extensions 20 to retain the assembly 72 within the unit 10. The spring-engaging levers 40 are then adjusted with respect to the side members 32, 33 and to each other so that each spring hook 42 will firmly engage a coil of spring 70 spaced from upper spring seat 77. Adjustment is effected by removing the bolt 44 for the corresponding lever 40 and inserting it through a new hole 46 in plage 47 after the holes in the lever 40 ear portions are aligned with the newly selected hole 46. The arms 40 are then pivoted to move hook portions 42 thereof into engagement with coils of the spring 70.

Once the levers 40 are properly hooked up, air is supplied through valve 59 to the air-adjustable shock absorbers 55 until the spring 70 is compressed the desired amount. Then, safety pin 68 is then inserted in the last uncovered hole 66 so that it abuts side member 32 of the assembly 30 to prevent backward movement thereof should the air in means 55 somehow be released. The self-damping of shocks 55 and the hoops 38 also provide safety functions.

The unit 72 is then worked upon, and when it is desired to allow spring 70 to return to its original position, the safety pin 68 is removed, and the air is allowed to leak out of means 55 through valve 59. Since the pneumatic means 55 are inherently self-damping, and since the valve 59 must be continuously consciously actuated and will only allow air to slowly bleed therethrough, there is no danger that the spring 70 will be released quickly. Springs 52 of the unit 10 assist in returning the assembly 30 to its original position, whereupon the assembly 72 can be removed, and the unit 10 is ready for another operation.

While the invention has been herein disclosed in what is presently conceived to be the most practical and preferred embodiment, it is apparent that many modifications may be made thereof within the scope of the invention, which scope is not to be limited except by the appended claims.

What I claim is:

1. A spring compressing unit comprising:
   a. a force-applying means for supplying the force necessary to compress a spring received by said unit;
   b. a pair of parallel side guide rods;
   c. a pair of parallel end plates rigidly attached to and terminating said guide rods, one of said end plates adapted to receive an assembly having a spring to be compressed, and the other of said end plates adapted to support said force-applying means; and
   d. a spring-engaging assembly guided by said guide rods, said assembly having (i) an end plate for connection to said force-applying means for transferring the force supplied by said force-applying means to compression of said spring; (ii) a pair of tubular side members adapted to receive said guide rods which guide the movement thereof; and (iii) spring-engaging means connected to said side members for positively engaging coils of said spring to be compressed spaced from the end thereof and from the exterior thereof.

2. A spring-compressing unit as recited in claim 1 wherein said unit further comprises a plurality of holes in one of said guide rods in a center portion thereof, and a pin for insertion into a selected one of said holes for abutting an end of said tubular guide member corresponding to said guide rod and maintaining said spring-engaging assembly in a spring-compressing position to which it is moved by said force-applying means.

3. A spring-compressing unit as recited in claim 1 wherein said spring-engaging means of said spring-engaging assembly are adjustable with respect to each other and with respect to said tubular side members to accommodate springs of various lengths and pitches.

4. A spring-compressing unit as recited in claim 1 wherein said spring-engaging means of said spring-engaging assembly includes a pair of levers, each lever pivotally connected at one end thereof to a portion of a corresponding side member, and having at the other end thereof a hook-shaped portion for hooking over a coil of said spring for positively engaging the same.

5. A spring-compressing unit as recited in claim 4 wherein each said portion of each of said side members to which a said lever is pivotally connected is a plate having a plurality of holes therein, and wherein each of said levers comprises a body portion and ear portions perpendicular to said body portion, said hook-shaped portion attached to said body portion, and said ear portions at the end of said lever for attachment to said side member having holes therein, each said lever being attached to said corresponding side member by running a bolt through said holes in said ear portions thereof and a selected hole in said plate of said side member, and threading a nut over said bolt.

6. A spring-compressing unit as recited in claim 1 wherein said unit further comprises safety hoop means connected to said side members of said spring-engaging assembly at ends thereof remote from said end plate of said spring-engaging assembly for preventing a spring being compressed from flying out of said unit between said side members.

7. A spring-compressing unit as recited in claim 1 wherein said end plate of said unit adapted to receive an assembly having a spring to be compressed has an open-ended cutout portion thereof for receiving said spring assembly, and a pin associated therewith for closing the open end of said cutout when said spring assembly is received thereby.

8. A spring-compressing unit as recited in claim 1 wherein said force-applying means includes pneumatically operated means having an inherent self-damping feature, and valve means for supplying air to and releasing air from said pneumatic means, said valve means allowing only slow bleeding of the air therethrough during release of the air from said pneumatic means.

9. A spring-compressing unit comprising:
  a. an inherently self-damping pneumatically operated force-applying means for supplying the force necessary to compress a spring received by said unit;
  b. a valve means for supplying air to and relieving air from said force-applying means, said valve means allowing only slow bleeding of air therethrough during release of the air from said pneumatic force-applying means;
  c. a pair of parallel side guide rods;
  d. a pair of parallel end plates rigidly attached to and terminating said guide rods, one of said end plates adapted to receive an assembly having a spring to be compressed, and the other of said end plates adapted to support said pneumatic force-applying means; and
  e. a spring-engaging assembly, said assembly receiving said guide rods and being slidable thereon and having an end plate, said end plate for engagement by said pneumatic force-applying means to transfer the force applied by said force-applying means to compression of said spring.

10. A spring-compressing unit as recited in claim 9 wherein said inherently self-damping pneumatically-operated force-applying means comprises a pair of air adjustable shock absorbers.

11. A spring-compressing unit as recited in claim 9 wherein said valve means comprises a conventional tire valve.

* * * * *